United States Patent
Howton

(10) Patent No.: US 7,024,267 B2
(45) Date of Patent: Apr. 4, 2006

(54) AUTOMOBILE GAUGE FACES MADE OF STAINLESS STEEL AND OTHER METALS

(75) Inventor: Jamie Howton, Hampshire, IL (US)

(73) Assignee: U.S. Speedo, Inc., Flint, MI (US)

( * ) Notice: Subject to any disclaimer, the term of this patent is extended or adjusted under 35 U.S.C. 154(b) by 383 days.

(21) Appl. No.: 10/662,154

(22) Filed: Sep. 12, 2003

(65) Prior Publication Data

US 2004/0059453 A1    Mar. 25, 2004

Related U.S. Application Data

(60) Provisional application No. 60/411,222, filed on Sep. 17, 2002.

(51) Int. Cl.
   *G06F 19/00* (2006.01)
(52) U.S. Cl. ..................... 700/117; 156/345.1
(58) Field of Classification Search ................ 700/117, 700/118–120, 159, 166; 156/272.8, 281, 156/390, 345.1

See application file for complete search history.

(56) References Cited

U.S. PATENT DOCUMENTS

| | | | |
|---|---|---|---|
| 6,854,350 B1 * | 2/2005 | Ayres | ........................ 73/866.3 |
| 2003/0230154 A1 * | 12/2003 | Ayres | ........................ 73/866.3 |
| 2004/0101624 A1 * | 5/2004 | Bayes | ........................ 427/337 |

* cited by examiner

*Primary Examiner*—Zoila Cabrera
(74) *Attorney, Agent, or Firm*—Raggio & Dinnin, P.C.

(57) ABSTRACT

A process for creating aftermarket vehicle gauge faces from a metal is disclosed. The process includes the steps of preparing a metal. The process also includes phototooling a phototool and then coating the metal after which an ultraviolet exposure is used. The process then will develop, and etch the metal to create predetermined letters, lines and characters and shapes on the metal gauge face. Next the gauge face is stripped and washed and a final inspection is used to create the aftermarket automobile gauge faces.

20 Claims, 3 Drawing Sheets

AUTOMOBILE GAUGE FACES MADE OF STAINLESS STEEL AND OTHER METALS

This application is a continuation of provisional application Serial No. 60/411,222 filed on Sep. 17, 2002

BACKGROUND OF THE INVENTION

1. Field of the Invention

The present invention generally relates to replacement parts for gauge faces, and more particularly relates to a process for manufacturing replacements for gauge faces found in vehicle instrument panels.

2. Description of Related Art

It is well known in the art to manufacture replacements for gauge faces found in automotive or other vehicle instrument panels. Generally, these automotive aftermarket gauge faces use aluminum or some other metal that includes letter, lines, and characters silk screened or painted on the surface of the replacement gauge face. Some of these automotive aftermarket companies have attempted to create the replacement gauge faces from some form of dies, cut from plastic and other associate methods. However, these methods of manufacturing the gauge faces tend to have inherent problems with accuracy and quality of the finished product. The quality issues are of particular importance in the automotive aftermarket. Vehicle operators are constantly scanning and looking at their instrument panels and the gauge faces placed thereon. These replacement gauge faces of the prior art methodologies may create unclean and sloppy looking gauge faces that are misaligned and do not project a clear image of the letters, lines and characters, silk-screened or otherwise formed and placed on the surface of the prior art automobile replacement gauge faces. Accuracy and quality problems with the prior art replacement vehicle gauge faces create customer complaints and less reliable gauge faces for use in replacing original equipment on an automotive vehicle.

Other attempts at creating or repairing automotive gauge faces have been tried since the instrument panel became part of the automotive vehicle in the early 20th century. However, none of these replacement gauge faces have the accuracy and quality of finish that automotive enthusiast want and desire. Therefore, there is a need in the art for a process for creating automobile gauge faces out of a metal that have high accuracy and high quality finishes. The high accuracy high quality of finish of these replacement gauge faces will allow automobile owners to confidently restore and replace automobile gauge faces that appear new to the user and others in the automotive vehicles. There is also a need in the art for a lower cost and faster machining process for creating automobile replacement gauge faces.

SUMMARY OF THE INVENTION

One object of the present invention is to provide an improved automobile gauge face.

Another object of the present invention is to provide a metal automobile gauge face with better fit, finish, accuracy and appearance.

Yet a further object of the present invention is to provide an automobile gauge face through a photochemical machining process.

Yet a further object of the present invention is to provide stainless steel or other metal automobile replacement gauge faces of different sizes and shapes and lettering.

To achieve the foregoing objects, a process for machining vehicle gauge faces is disclosed. The process includes the steps of phototooling a predetermined sized and shaped vehicle gauge face. Preparing a predetermined size and shape of metal. The process then coats the metal with predetermined shapes of photoresist. Next the photoresist coating is exposed to ultra-violet light while it is held in close proximity to the phototooling which is then developed to remove the unexposed photoresist. Then the metal is etched on a first and second surface thereof. Next the process includes stripping the remaining photoresist from the vehicle gauge face.

One advantage of the present invention is it provides a novel and improved automobile gauge face.

Still a further advantage of the present invention is that the automobile gauge faces are manufactured from a stainless steel or other sheet of metal.

Yet another advantage of the present invention is that the automobile gauge faces created by the process of the present invention produce a higher quality part.

Yet another advantage of the present invention is that the automobile gauge faces created by the process of the present invention have better fit, finish, accuracy and appearance.

Still another advantage of the present invention is the ability to have letter lines and characters on the automobile gauge face accurate to within 0.0005 inches.

Other objects, features and advantages of the present invention will become apparent from the subsequent description and the appended claims, taken in conjunction with the accompanying drawings.

DESCRIPTION OF THE EMBODIMENT(S)

Figure 1:
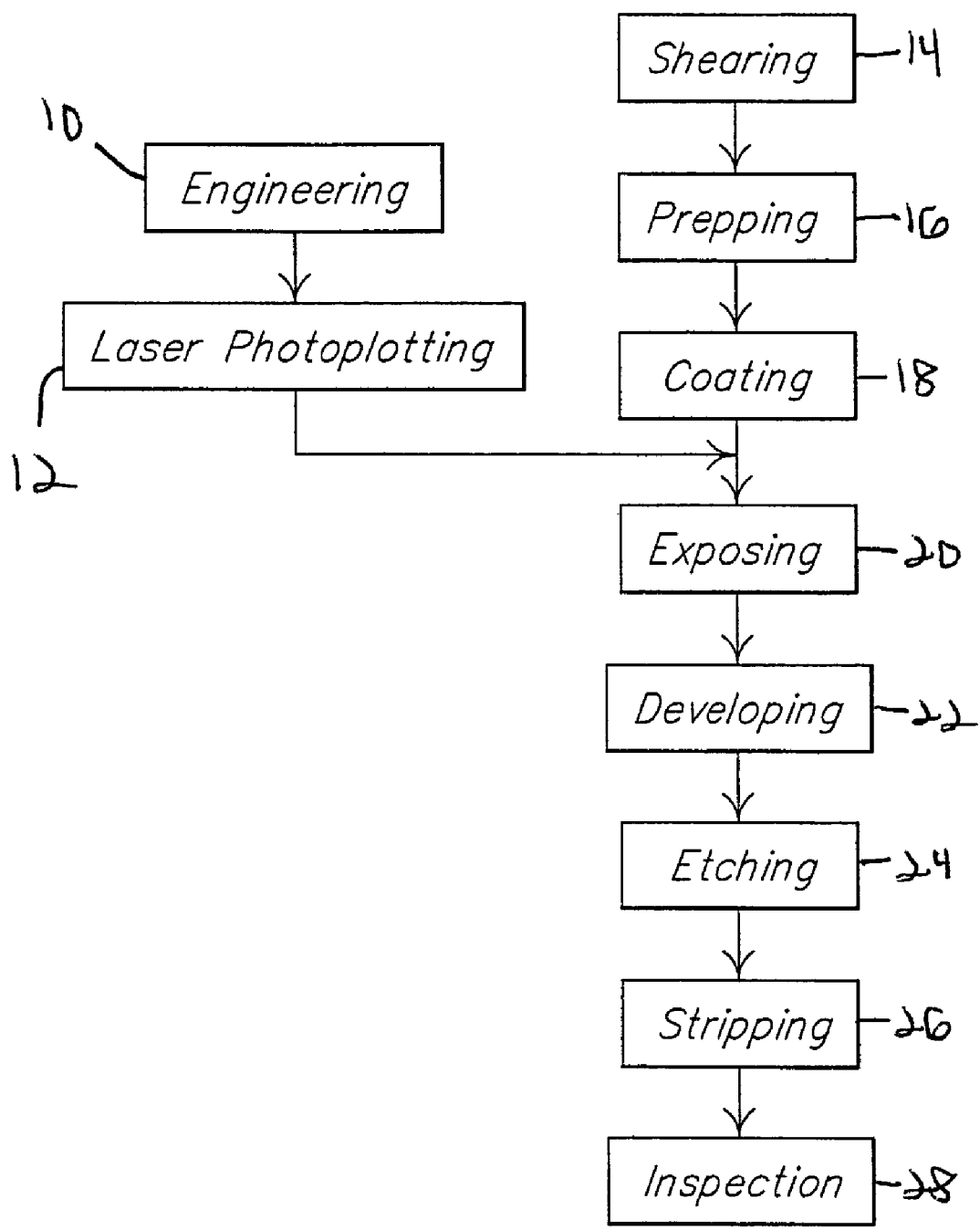
FIG. 1 shows a flow chart of the process for producing vehicle gauge faces according to the present invention.

Referring to the drawings, a process for fabricating replacement vehicle gauge faces and the vehicle gauge faces produced by this process are shown.

Figure 2:
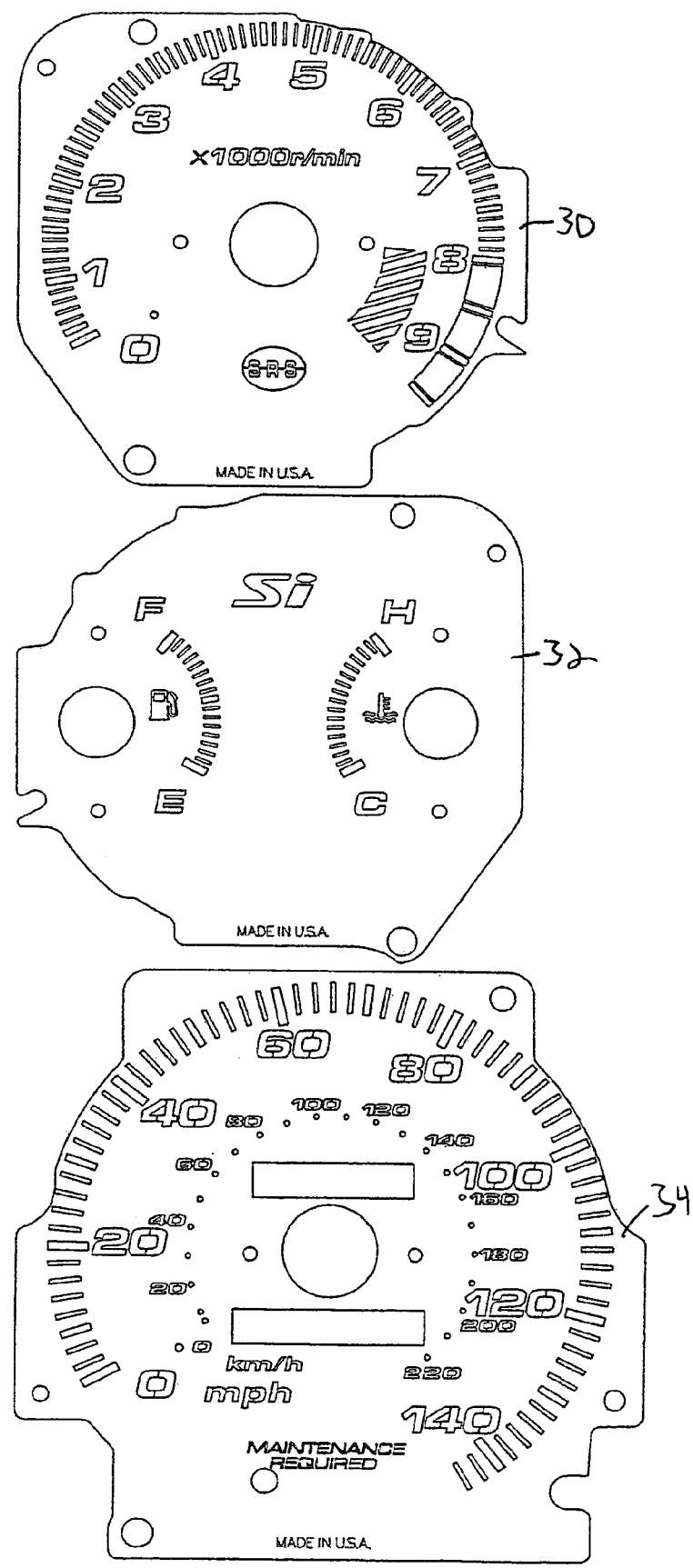
FIG. 2 shows vehicle gauge faces produced by the process of the present invention.
Figure 3:
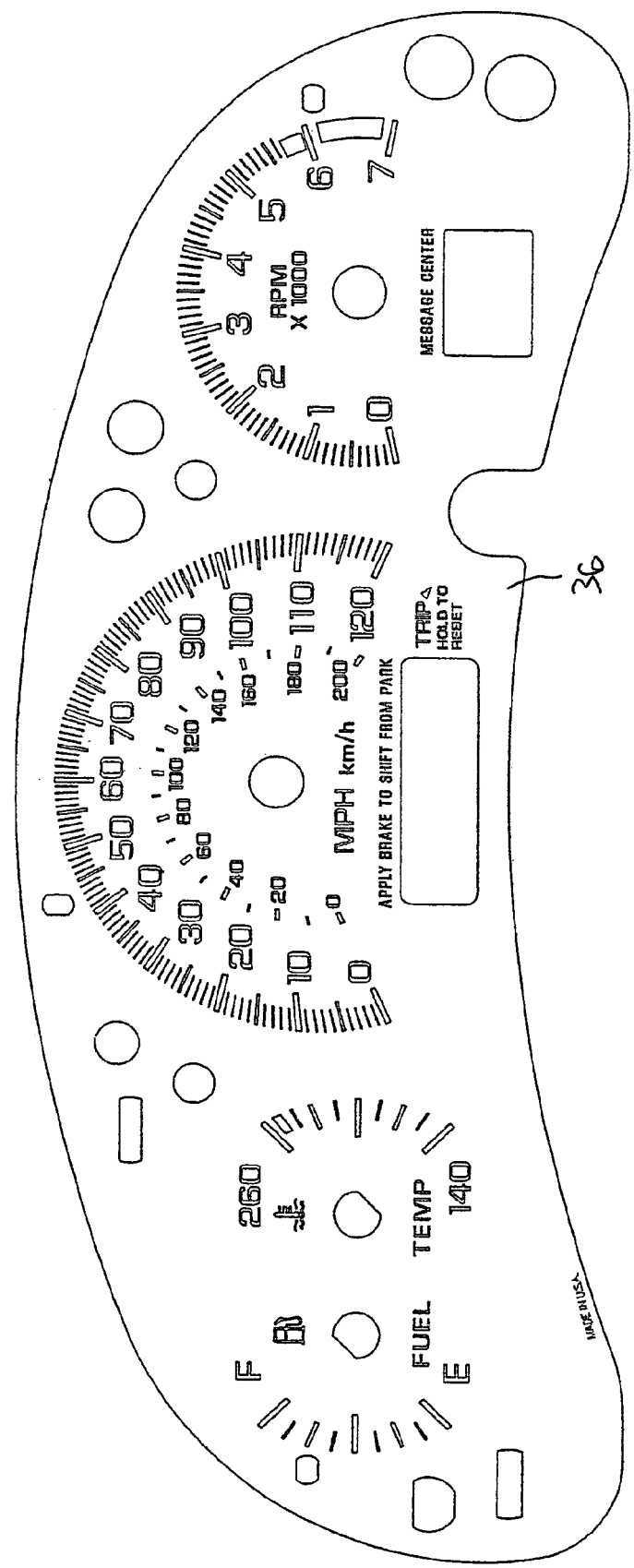
FIG. 3 shows yet another vehicle gauge face produced by the process of the present invention.

It should be noted that the vehicle gauge faces 30, 32, 34, 36 are primarily used for automotive vehicles and are primarily sold in the automobile aftermarket by companies that manufacture such gauges as replacement parts for gauge faces found in automotive instrument panels. Therefore, the shape, size, lettering, lines and characters located on each gauge face is unique to the automotive vehicle for which the replacement gauge face is developed. FIGS. 2 and 3 show a representative sample of the many designs which can be made by the process of the present invention for creating replacement gauge faces for vehicles or the like. It should be noted that the gauge faces are primarily made for replacement in automotive instrument panels, but that the gauge faces can be produced for any type of vehicle, such as a boat, airplane, snowmobile, motorcycle, space vehicle, etc., or any other vehicle capable of movement.

FIG. 1 shows a process flow chart for the production of a replacement gauge face for a vehicle. In the preferred embodiment the gauge faces are created from a stainless steel. However, it should be noted that any other metal, soft and/or hard or the like including brittle or flexible metals may be used to create the automobile gauge faces, but in the preferred embodiment stainless steel is used to create the automobile replacement gauge faces. The flow chart generally shows the process used in the photochemical machining of the metal into the appropriate automobile gauge face for the predetermined automotive vehicle replacement part. It should be noted that any other process or machining process may be used as long as it produces similar quality parts to that of photochemical machining. The process begins in block 10 where engineering is performed on an initial order from a customer. The engineering step will involve converting data into a digital data format such as computer aided design (CAD) file format or other format capable of being computerized and digitized into a proper file format. The order will be analyzed to determine if the system can precisely fit the requirements of the ordered gauge face. Once it is determined that the system can accomplish the requirements of the ordered gauge face an electronic copy or hard copy of the gauge face including all lettering, lines and characters and overall shape will be digitized into a CAD file format via a high resolution scanner or the like. It should be noted that any other type of importing of the overall shape medium may be used but in this embodiment a high resolution scanner is used.

After the original design is digitized into a proper CAD file format the process will enter block 12 where the CAD file will be plotted onto a film to produce a phototool via a laser photo plotting machine. In our case the preferred laser photo plotting machine is a Mivatec system. However, it should be noted that any other type of photo plotter, laser or otherwise may be used to create the phototool for use in the photochemical machining of the replacement gauge faces. In our embodiment photographic chemicals and lithographic film are used to produce the phototool. The phototool will create a precise blank or form of the specific letter, lines and characters for use on the replacement automobile gauge face. It should be noted that the CAD image laser is plotted to one quarter mil resolution. However, it should further be noted that greater resolution may also be required or high resolution can be used depending on the software and laser plotter being used. Also the two-sided working phototool is accurate to within 0.0005 inches of tolerance. Therefore, very detailed and accurate representations of small letters, characters, lines and shapes may be formed into the metal.

The process for creating the gauge face then in block 14 will shear the material to be used for the automobile gauge face 38 as discussed above, the preferred embodiment is stainless steel in the present invention. However, any other metal such as but not limited to aluminum, brass, copper, lead, nickel silver, silver, all steels, spring steel, zinc and all other known metals may be used for the replacement automobile gauge faces. The step of shearing will involve removing metal from stock and shearing it into sheets. It should be noted that the metal stock will also be chosen based on the preferred thickness of the automobile gauge face. A metal shear tool will shear the metal for the automobile gauge face into the appropriate size for the gauge face. It should be noted that the metal stock is labeled for lot control for traceability of any issues in the future and also requires certification of the metal by the appropriate standards to be applied before use in the face gauges.

In block 16 the process will prep or prepare the metal automobile gauge face. This is done by both a chemical and mechanical cleaning of the metal. These chemical and mechanical cleanings include degreasing and rinsing of the metal and then an acid wash followed by a scrubbing and drying of the metal. The metal will then be inspected for cleanliness. A Chemcut® 547XL cleanline machine is used to perform the acid wash in the preferred embodiment. However, it should be noted that any other type of acid wash machinery may be used for this process. Any suitable degreaser and acid wash may also be used for the preparation of the metal.

The process then will enter block 18 which will coat the metal. The metal will be coated with a laminate of photo resist on both sides of the metal. This is performed using any known hot roll laminator. Any type of photo resist may be used to laminate both sides of the metal. In our preferred embodiment Kolon photo resist is the photo resist of choice. It should be noted that during the coating phase a photo resist is bonded to the metal and that the exit temperature is precisely controlled to the predetermined photo resist requirements.

Next the process for creating the vehicle gauge face will expose the photo resist to UV light through the phototool that was created in the laser photo plotting machine. The exposure to the ultraviolet light will polymerize the photo resist to the metal. The phototool is placed on the metal and an ORC exposing machine or the like, that has the ultraviolet light controlled by a Stouffer 21-step-tablet in our example, is used to expose the photo resist through the phototool on the metal gauge face. Any other known exposing machine and tablet may also be used.

The process next will develop the photo resist in block 22 to remove the unexposed area of the photo resist from the metal gauge face. Any type of developer may be used and in our preferred embodiment a one percent by volume potassium carbonate is the preferred developer used in conjunction with a development machine. The equipment in our case is a Chemcut® developer 547XL machine. The developer solution will be heated to a predetermined temperature. In our embodiment the predetermined temperature is approximately 85° F. However, any range of temperature necessary to activate the developer solution correctly may be used such as from −50° F. to 290° F. During the developing phase any of the photo resist on the unexposed surfaces of the metal gauge face will be dissolved away. Break point tests are performed during the developing stage either visually or via automated machines. Once the developer has had a chance to completely dissolve away the photo resist from the unexposed surfaces, a thorough rinsing and air drying is conducted on the metal gauge face.

Next the process for creating a vehicle gauge face enters block 24 where the metal is etched to remove the exposed area of the metal gauge face. In this etching step a chemical acid etchant is used and sprayed on both sides or surfaces of the metal gauge face simultaneously. In our case the chemical acid etchant is a 40° Be ferric chloride etchant. It can be used in any known etcher machine but in our embodiment a Chemcut® etcher 547XL is used. The speed of the etching process is based on the chemicals used and the metal type and thickness, and is controlled and varied by changing the conveyor speed of the etching machine and controlling the etchant chemistry. It should be noted that the top and bottom metal removal may be varied if desired. Therefore, a portion of the metal may be removed from the top while the bottom portion of that metal is kept in place or vice versa. During the etching stage of the process the speed, specific gravity, Ph O.R.P. and etchant temperature are charted and adjusted as necessary to create the specific and accurate letter, lines and characters in the automobile gauge face.

Next the process will enter block 26 where a stripping will occur of the photo resist from the metal by use of a stripping solution. Generally, an alkaline wash will be used to remove the photo resist with a dissolving action from the metal gauge face. In our embodiment the preferred chemical alkaline wash is a 15% by volume sodium hydroxide stripper. The stripped metal automobile gauge faces will then exit a conveyorized stripper/dryer free of water spots and having a high quality appearance.

Next a final inspection of the automobile gauge face parts is done to insure compliance with any predetermined specifications. This includes the finished parts being compared to blueprints and the like. Assorted inspection equipment is also used and calibrated to NBS standards and compared to the automobile gauge faces and the required components for automobile gauge faces in the industry. Next the cleaned and accurate high quality finish and perfect fit part is securely packaged and shipped to the necessary customer.

It should be noted that the photochemical machining of the aftermarket vehicle gauge faces increases the speed of creating such parts while lowering the cost and increasing the precision to within 0.0005 inches. This will ensure higher quality, accuracy, fit and finish than the prior art method that either silk-screened, painted or used some form of die cut plastic to create letters, lines and characters on a surface of the prior art gauge faces.

FIGS. 2 and 3 show a sampling of the products created by the claimed process of the present invention. FIG. 2 shows a replacement vehicle gauge face for a tachometer 30, a replacement vehicle gauge face for an engine heat sensor and fuel sensor 32, and a replacement gauge face for a speedometer 34 for an automobile vehicle or the like. FIG. 3 shows a larger replacement gauge face 36 that includes both a speedometer face, a tachometer face and a temperature and fuel gauge along with message center and other trip and warning light areas in the instrument panel gauge face. As noted above stainless steel is the preferred metal but any other metal may be used depending on the vehicle requirements and the availability of certain metals in certain parts of the automotive aftermarket.

The present invention has been described in an illustrative manner. It is to be understood that the terminology which has been used is intended to be in the nature of words of description rather than of limitations.

Many modifications and variations of the present invention are possible in light of the above teachings. Therefore, within the scope of the appended claims, the present invention may be practiced otherwise than as specifically described.

What is claimed is:

1. A process of making vehicle gauge faces, said process including the steps of:
   phototooling a predetermined sized and shaped vehicle gauge face;
   preparing a predetermined size and shape metal;
   coating said metal using a phototool of said vehicle gauge face;
   developing said coating on a surface of said metal vehicle gauge face;
   etching said metal vehicle gauge face on a first and second surface; and
   stripping said etched metal vehicle gauge face.

2. The process of claim 1 further including the steps of preparing initial size and shape for said vehicle gauge face to digital data in a predetermined file format.

3. The process of claim 2 wherein said step of phototooling includes plotting said digital data file.

4. The process of claim 1 further including the steps of shearing said metal stock to said predetermined size and shape.

5. The process of claim 1 further including the steps of exposing said coating to a UV light.

6. The process of claim 1 further including the steps of inspecting said metal vehicle gauge face to predetermined specifications.

7. The process of claim 1 wherein said step of preparing includes chemically and mechanically cleaning said metal.

8. The process of claim 1 wherein said step of coating places a laminate on said metal with a photo resist on both sides of said metal.

9. The process of claim 8 wherein said step of developing, develops said photoresist to remove an unexposed area from said metal.

10. The process of claim 9 wherein said step of etching removes an exposed area from said metal.

11. The process of claim 8 wherein said step of stripping dissolves said photo resist by a stripping solution leaving said metal vehicle gauge face characters, lines, and lettering intact.

12. The product produced by the process of claim 1.

13. A process of machining vehicle gauge faces from a metal material, said process including the steps of:
   preparing design data of the vehicle gauge face into a digital data of a predetermined file format;
   photo plotting said digital data with a laser onto film to produce a phototool;
   coating a predetermined sized metal vehicle gauge face with a photo resist on both sides of said metal vehicle gauge face;
   exposing said photo resist to an UV light through said phototool;
   developing said photo resist to remove an unexposed area of said photoresist from said metal vehicle gauge face;
   etching said metal vehicle gauge face to remove an exposed area of said photo resist;
   stripping said photo resist with a stripping solution from said metal vehicle gauge face; and
   inspecting completed metal vehicle gauge face for compliance with predetermined specifications.

14. The process of claim 13 further including the steps of:
   shearing said metal vehicle gauge face from a metal stock;
   preparing said metal vehicle gauge face by chemically and mechanically cleaning said metal.

15. The process of claim 13 wherein said steps of developing uses a potassium carbonate substance to develop said photo resist.

16. The process of claim 13 wherein said steps of etching uses a 40° Be-Ferric Chloride as said etchant.

17. The process of claim 16 wherein said etchant is sprayed on both sides of said metal vehicle gauge face.

18. The process of claim 13 wherein said steps of stripping uses a Sodium Hydroxide compound as said stripper.

19. The process of claim 13 wherein said exposing will polymerize said photo resist.

20. The product produced by the process of claim 13.

* * * * *